United States Patent
Lo Calzo et al.

(10) Patent No.: US 11,135,928 B2
(45) Date of Patent: Oct. 5, 2021

(54) ELECTRIC SYSTEM OF A ROAD VEHICLE PROVIDED WITH A DC-DC ELECTRONIC POWER CONVERTER

(71) Applicant: FERRARI S.p.A., Modena (IT)

(72) Inventors: Giovanni Lo Calzo, Modena (IT); Ugo Sitta, Renazzo Cento (IT); Roberto Betro', Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 16/845,899

(22) Filed: Apr. 10, 2020

(65) Prior Publication Data
US 2020/0324659 A1      Oct. 15, 2020

(30) Foreign Application Priority Data
Apr. 12, 2019    (IT) .................. 102019000005664

(51) Int. Cl.
*B60L 53/20*      (2019.01)
*B60K 6/28*        (2007.10)

(52) U.S. Cl.
CPC ............... *B60L 53/20* (2019.02); *B60K 6/28* (2013.01); *B60L 2210/10* (2013.01); *B60L 2210/40* (2013.01); *B60Y 2200/92* (2013.01)

(58) Field of Classification Search
CPC .................................. B60L 53/20; B60K 6/28
See application file for complete search history.

(56) References Cited

U.S. PATENT DOCUMENTS

| | | | |
|---|---|---|---|
| 10,079,541 B1 * | 9/2018 | Taban | H02J 7/00 |
| 2003/0107352 A1 | 6/2003 | Downer et al. | |
| 2003/0117019 A1 * | 6/2003 | Furukawa | B60L 58/20 |
| | | | 307/10.6 |
| 2012/0181854 A1 | 7/2012 | Gopalakrishnan et al. | |
| 2015/0054337 A1 | 2/2015 | Ogale et al. | |
| 2015/0336468 A1 * | 11/2015 | Sugiyama | B60L 58/21 |
| | | | 701/22 |
| 2016/0031440 A1 * | 2/2016 | Youn | B60W 10/06 |
| | | | 701/22 |

(Continued)

FOREIGN PATENT DOCUMENTS

EP      2429057 A1      3/2012

OTHER PUBLICATIONS

Search Report issued in Italian Patent Application No. 201900005664, completed Dec. 9, 2019; 11 pages.

*Primary Examiner* — Adi Amrany
(74) *Attorney, Agent, or Firm* — Cantor Colburn LLP

(57) ABSTRACT

An electric system of a road vehicle; the electric system has: a high-voltage electric circuit provided with a first storage system; a low-voltage electric circuit provided with a plurality of electrical loads; and a DC-DC electronic power converter, which connects the low-voltage electric circuit and the high-voltage electric circuit to one another. The DC-DC electronic power converter has: a high-voltage input; a low-voltage output; a conversion device; a control unit, which controls the conversion device; and a second storage system connected to the low-voltage output. The control unit, only when the vehicle is parked, is configured to detect a state of charge of the second storage system and to activate the conversion device only when the state of charge of the second storage system is below a charge threshold to charge the second storage system.

16 Claims, 5 Drawing Sheets

(56) References Cited

U.S. PATENT DOCUMENTS

| | | | |
|---|---|---|---|
| 2016/0072388 A1* | 3/2016 | Dubus | H02M 3/3376 |
| | | | 363/25 |
| 2016/0290304 A1* | 10/2016 | Yukawa | B60L 58/20 |
| 2017/0080810 A1* | 3/2017 | Choi | B60L 53/20 |
| 2017/0282728 A1* | 10/2017 | Jeon | B60K 6/28 |
| 2019/0275968 A1* | 9/2019 | Kim | B60L 1/10 |
| 2019/0326772 A1* | 10/2019 | Shields | B60L 3/0069 |

\* cited by examiner

ELECTRIC SYSTEM OF A ROAD VEHICLE PROVIDED WITH A DC-DC ELECTRONIC POWER CONVERTER

CROSS-REFERENCE TO RELATED APPLICATIONS

This Patent Application claims priority from Italian Patent Application No. 102019000005664 filed on Apr. 12, 2019, the entire disclosure of which is incorporated herein by reference.

TECHNICAL FIELD

The invention relates to an electric system of a road vehicle provided with a DC-DC electronic power converter.

The invention finds advantageous application in a road vehicle with hybrid drive, to which explicit reference will be made in the description below without because of this losing in generality.

PRIOR ART

A hybrid vehicle comprises an internal combustion heat engine, which transmits a torque to the drive wheels by means of a drivetrain provided with a transmission, and at least one electric machine, which is electrically connected to a power storage system and is mechanically connected to the drive wheels.

The electric system f a hybrid vehicle comprises an electric circuit with a high voltage (in relative terms, it could also have a nominal voltage of mere 48 Volts) and a high power, to which the electric machine is connected; the high-voltage electric system comprises a storage device (provided with at least one pack of chemical batteries) and a two-way DC-AC electronic power converter, which, on the direct current side, is connected to the storage device and, on the alternating current side, is connected to the electric machine and fulfils the function of controlling the electric machine.

The electric system of a hybrid vehicle further comprises an electric circuit with a low voltage (having a nominal voltage of 12 Volts) and a low power, to which all auxiliary electric services (for instance, the control units, the infotainment system, the anti-theft system, the passenger compartment lighting system, the outer lights, the electric starter motor of the heat engine . . . ) are connected. Generally speaking, the low-voltage electric circuit is provided with a storage device of its own (provided with one single electric battery, which is relatively heavy and large-sized) having a high inrush current (power) needed to supply (for a few seconds) the electric starter motor of the heat engine. Furthermore, in general, a DC-DC electronic power converter is provided, which connects the low-voltage electric circuit and the high-voltage electric circuit to one another so as to transfer electrical energy from the high-voltage electric circuit to the low-voltage electric circuit (or even vice versa, in case on-board management strategies allow for it); namely, the electric energy provided by the high-voltage electric circuit is used both to charge the storage device of the low-voltage electric circuit and to supply the electrical loads of the low-voltage electric circuit (with the exception of the electric starter motor of the heat engine for the short instant in which it initiates the engine's operation).

Patent application US2012181854A1 discloses an electric system of a hybrid vehicle, wherein both a high-voltage storage device (namely, directly connected to the high-voltage storage electric circuit) and a low-voltage storage device (namely, directly connected to the low-voltage electric circuit) are provided; the low-voltage storage device is charged by the high-voltage storage device by means of a suitable DC-DC electronic power converter, which connects the low-voltage electric circuit and the high-voltage electric circuit to one another.

Patent application US2003107352A1 discloses an electric system of a hybrid vehicle, wherein the high-voltage electric circuit is completely free from a storage system of its own; indeed, storage systems are present only in the low-voltage electric circuit; a DC-DC electronic power converter is provided, which connects the low-voltage electric circuit and the high-voltage electric circuit to one another so as to exchange electrical energy between the low-voltage storage systems and electric machines connected to the high-voltage electric circuit.

In order to try and reduce the weight and the size of the low-voltage electric circuit, the storage device of the low-voltage electric circuit can be eliminated and the electric power that can be delivered by the DC-DC electronic power converter can be increased; however, with this design solution, the total weight saved turns out to be modest (while the total manufacturing costs significantly increase), as the nominal power of the DC-DC electronic power converter must increase from approximately 2 kW (needed to supply all the electrical loads during the normal running of the vehicle) to more than 10 kW (needed by the electric starter motor during the few instants in which it initiates the engine's operation)

Furthermore, when the storage device of the low-voltage electric circuit is eliminated, the DC-DC electronic power converter needs to always remain active, even when the vehicle is parked, so as to supply the necessary power to the electrical loads that always need to be powered (typically, the anti-theft system, which is always active when the vehicle is parked, and the infotainment system, which could dialogue with the owner of the vehicle from a distance or with a remote assistance centre when the vehicle is parked). As a consequence, the DC-DC electronic power converter is continuously stressed (namely, it needs to work 24/7) and, hence, it requires a more expensive designing in order to be able to stand continuously operating for an adequately long amount of time (taking into account the fact that the minimum life of a vehicle is at least ten years).

DESCRIPTION OF THE INVENTION

The object of the invention is to provide an electric system of a road vehicle provided with a DC-DC electronic power converter, said electric system not being affected by the drawbacks described above and, at the same time, being easy and economic to be manufactured.

According to the invention, there is provided an electric system of a road vehicle provided with a DC-DC electronic power converter according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
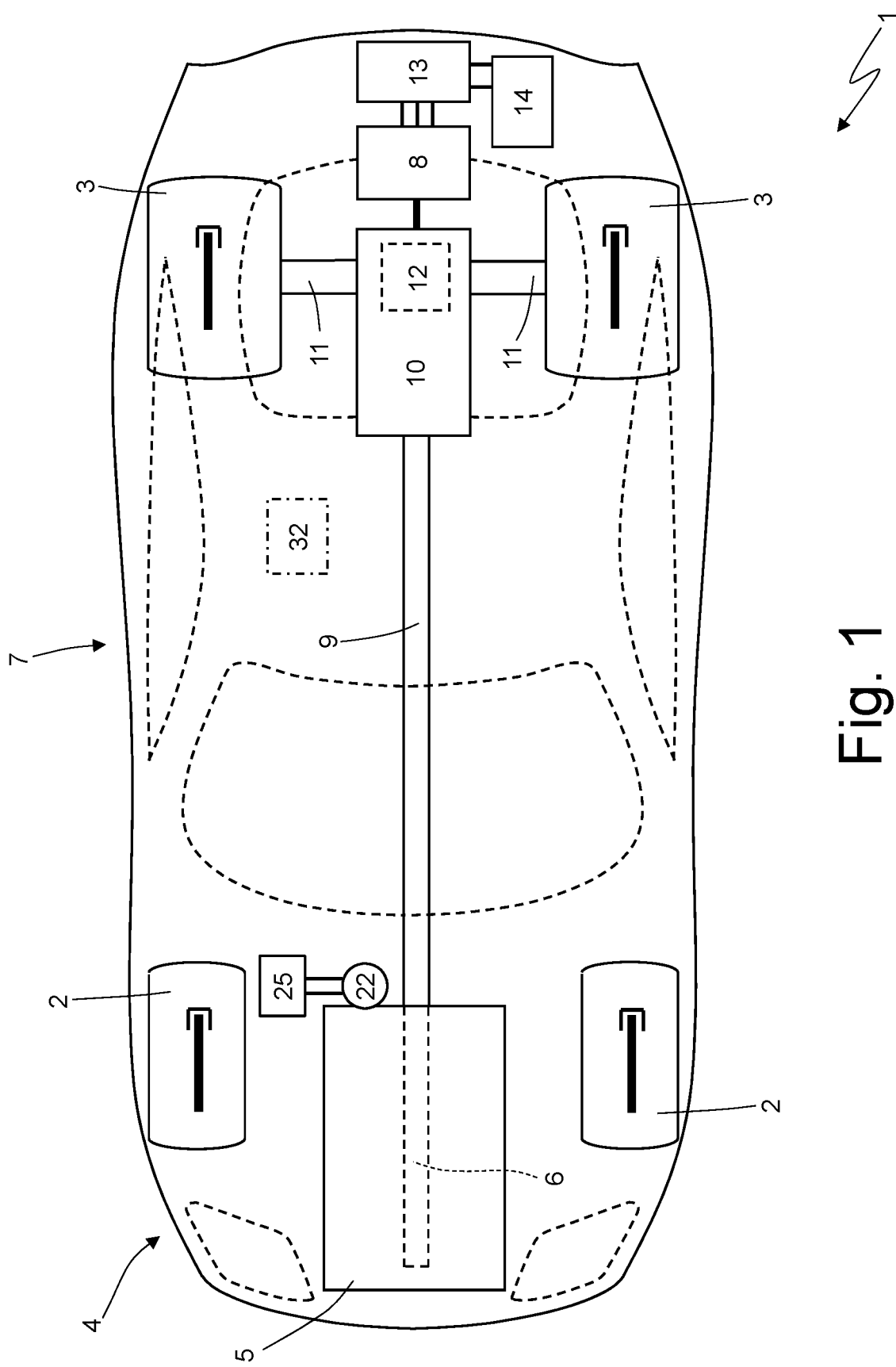
FIG. 1 is a schematic, plan view of a road vehicle with a hybrid (namely, both thermal and electric) drive and provided with an electric system according to the invention.

In FIG. 1, number 1 indicates, as a whole, a road vehicle with hybrid drive, which is provided with two front wheels 2 and two rear drive wheels 3, which receive the torque from a hybrid powertrain system 4.

The hybrid powertrain system 4 comprises an internal combustion heat engine 5, which is arranged in a front position and is provided with a crankshaft 6, a drivetrain 7, which transmits the torque generated by the internal combustion engine 5 to the rear drive wheels 3, and an electric machine 8, which is mechanically connected to the drivetrain 7 and is reversible (i.e. it can work both as an electric motor, absorbing electrical energy and generating a mechanical torque, and as an electric generator, absorbing mechanical energy and generating electrical energy).

The drivetrain 7 comprises a drive shaft 9, which, on one side, is angularly integral to the crankshaft 6 and, on the other side, is mechanically connected to a transmission 10, which is arranged in a rear position and transmits the motion to the rear drive wheels 3 by means of two axle shafts 11, which receive the motion from a differential 12.

The electric machine 8 is mechanically connected to the transmission 10 and is controlled by an AC/DC electronic power converter 13 (namely, an "inverter"), which is connected to an electrical energy storage system 14 provided with chemical batteries. In this application the DC-AC electronic power converter 13 is a two-way power converter and comprises a direct current side, which is connected to the storage system 14, and a three-phase alternating current side, which is connected to the electric machine 8.

Figure 2:
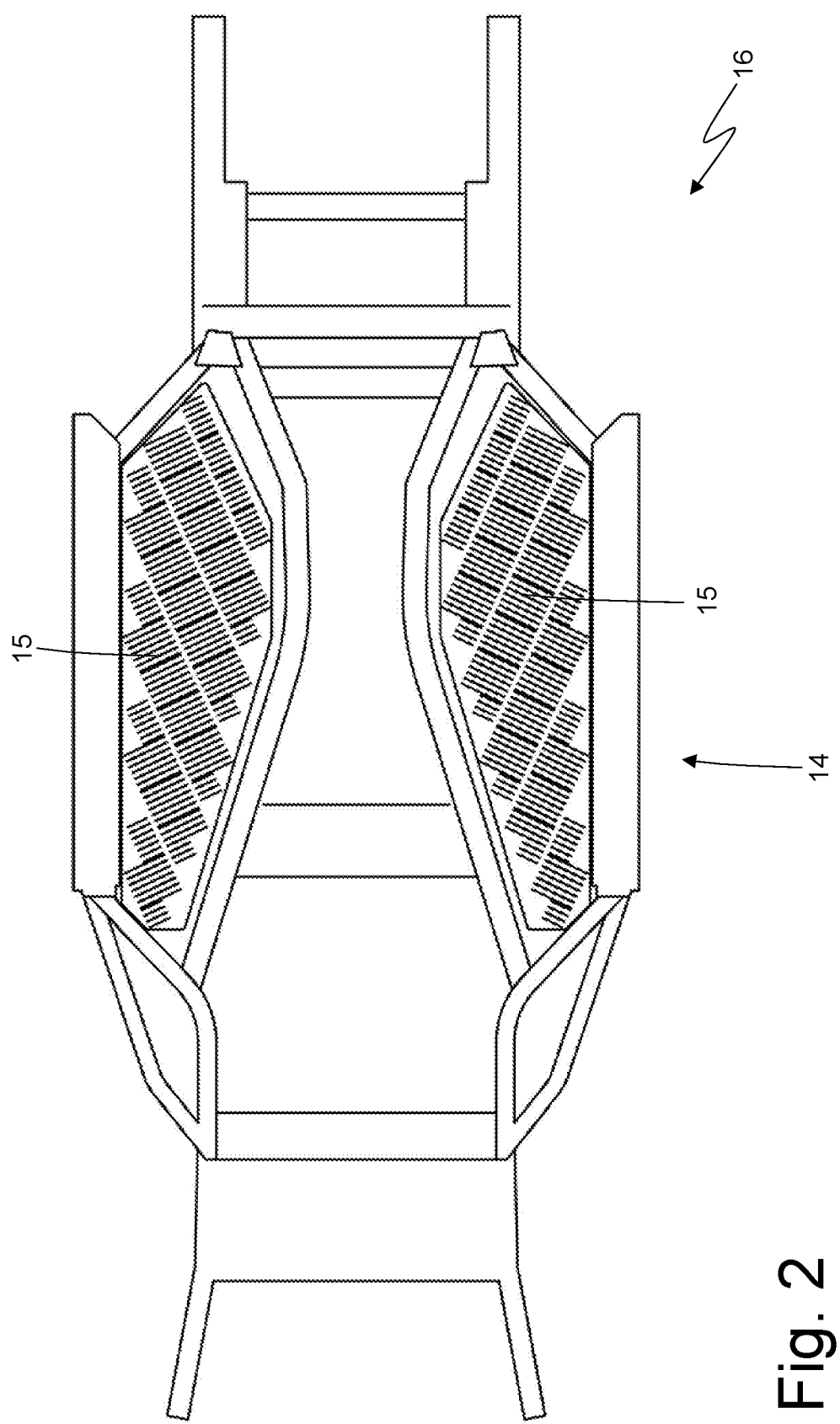
FIG. 2 is a schematic, plan view of a frame of the road vehicle of FIG. 1, highlighting an electric energy storage system.

According to FIG. 2, the storage system 14 comprises two distinct packs 15 of chemical batteries, each consisting of a plurality of chemical batteries connected to one another in series and/or in parallel; each chemical battery comprises respective electrochemical cells, which are designed to turn the chemical energy stored into electrical energy and vice versa. Furthermore, the road vehicle 1 is provided with a frame 16 comprising a platform, which makes up a bottom wall of the passenger compartment; in the platform there are two housings accommodating the two packs 15 of chemical batteries, which rest on the platform itself.

Figure 3:
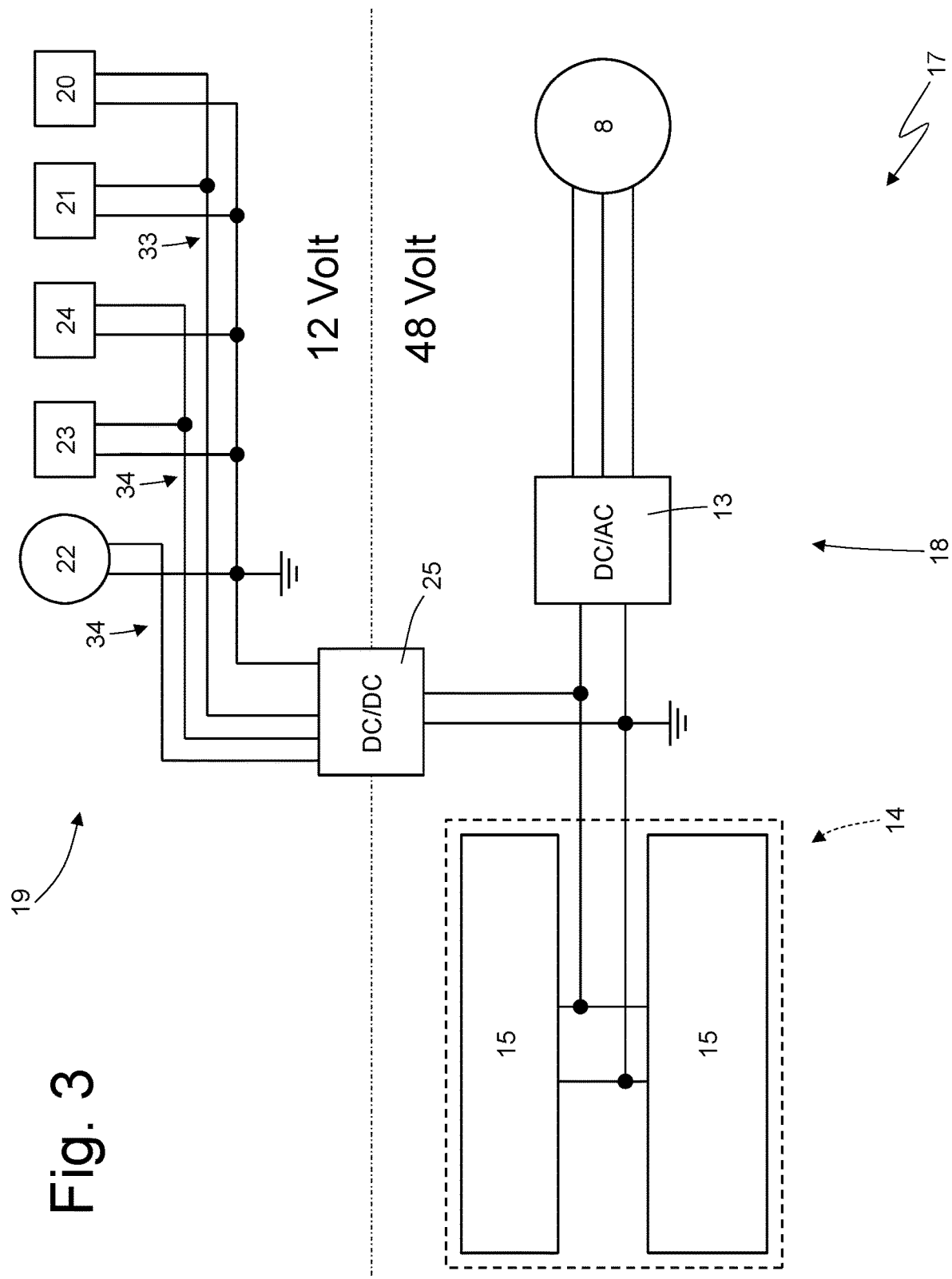
FIG. 3 is a schematic view of an electric system of the road vehicle of FIG. 1, which is manufactured according to the invention.

According to FIG. 3, the road vehicle 1 is provided with an electric system 17, which comprises an electric circuit 18 with a high voltage (in relative terms) and a high power having a nominal voltage of 48 Volts and an electric circuit 19 with a low voltage and a low power having a nominal voltage of 12 Volts. It should be pointed out that the electric circuit 18 is defined "high-voltage" circuit because it has a nominal voltage (48 Volts) which is greater than the nominal voltage (12 Volts) of the electric circuit 19, namely the definition "high voltage" should be interpreted as concerning the sole electric system 17 and with reference to the electric circuit 19 having a nominal voltage of 12 Volts.

The high-voltage electric circuit 18 comprises the storage system 14 and the AC/DC electronic power converter 13, which, on one side, is connected to the storage system 14 and, on the opposite side, is connected to the electric machine 8 (namely, to the stator windings of the electric machine 8).

The low-voltage electric circuit 19 comprises a plurality of electrical loads, each designed to only absorb electrical energy for its own operation (namely, none of these electrical loads are capable of generating electrical energy). In particular, the electrical loads comprise (high-priority) continuous electrical loads, which have a modest absorption of power and must be constantly supplied with power regardless of the use of the road vehicle 1 (namely, they must constantly be supplied with power even when the road vehicle 1 is parked) and (low-priority) occasional electrical loads, which must be supplied with power only when the road vehicle 1 is being used and, often, only for limited amounts of time.

The (high-priority) continuous electrical loads comprise, for example, an alarm system 20 and an infotainment system 21; obviously, further continuous electrical loads other than the ones mentioned above can be provided, such as, for example, electronic control units which, in case of interruption of the supply of power, generate, when they are restarted, an error message (namely, those electronic control units which, despite being capable of operating in standby and low-energy mode, always need to be powered with continuity or otherwise generate errors when they are restarted). On the other hand, the occasional electrical loads comprise, for example, an electric starter motor 22, a passenger compartment lighting system 23, the outer lights 24, an air conditioning system (not shown), the different electronic control units (not shown) . . . ; obviously, further occasional electrical loads other than the ones mentioned above can be provided.

The electric system 17 comprises a DC-DC electronic power converter 25, which connects the low-voltage electric circuit 19 and the high-voltage electric circuit 18 to one another in order to transfer electrical energy from the high-voltage electric circuit 18 to the low-voltage electric circuit 19 (or even vice versa in case on-board management strategies allow for it). It should be pointed out that the low-voltage electric circuit 19 is completely free from an external electrical energy storage system of its own independent of the DC-DC electronic power converter 25; namely, the low-voltage electric circuit 19 does not comprise any electrical energy storage system besides the DC-DC electronic power converter 25.

Figure 4:
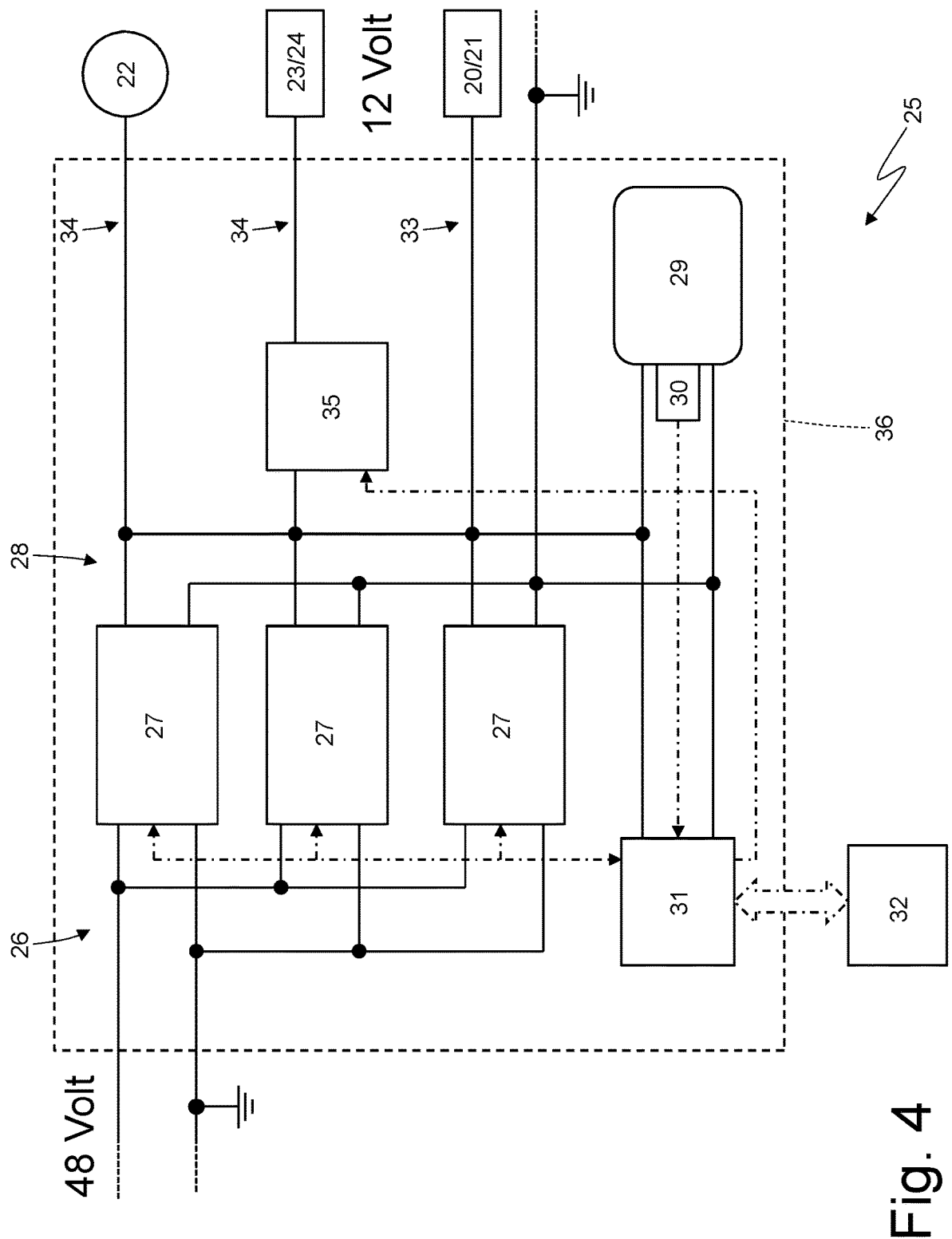
FIG. 4 is a schematic view of a DC-DC electric power converter of the electric system of FIG. 3.

According to FIG. 4, the DC-DC electronic power converter 25 comprises a high-voltage input 26 (namely, having a nominal voltage of 48 Volts), which is connected to the storage system 14 and to which the inputs of three conversion devices 27 are connected (in parallel), each conversion device being capable of varying the DC electrical voltage (from 48 Volts to 12 Volts and vice versa). Furthermore, the DC-DC electronic power converter comprises a low-voltage output 28 (namely, having a nominal voltage of 48 Volts), which is connected to the electrical loads of the low-voltage electric circuit 19 and to which the outputs of three high-voltage conversion devices 26 are connected. In other words, the three conversion devices 27 are connected to one another in parallel both at the input (in the high-voltage input 26 of the DC-DC electronic power converter 25) and at the output (in the low-voltage output 28 of the DC-DC electronic power converter 25); namely, the inputs of the high-voltage conversion devices 26 are connected to one another in parallel and the outputs of the three high-voltage conversion devices 26 are connected to one another in parallel.

The DC-DC electronic power converter 25 comprises an electrical energy storage system 29, which is an integral part of the DC-DC electronic power converter 25 (namely, is arranged inside a casing of the DC-DC electronic power converter 25) and is connected to the low-voltage output 28. The storage system 29 has a modest nominal power (namely, at most, in the range of 20-30 Watts) and a modest storable electric charge (in the range of 1-6 Ah, namely at least one order of magnitude smaller than a conventional car battery and at least two orders of magnitude smaller than the storage system 14) and is exclusively dedicated to supplying the continuous electrical loads with power when the road vehicle 1 is parked. The storage system 29 can only comprise supercapacitors, can only comprise one single chemical battery or can comprise a supercapacitor and a chemical battery connected to one another in parallel.

The DC-DC electronic power converter 25 comprises a charge sensor 30, which is designed to cyclically detect the state of charge of the storage system 29, namely the percentage of residual (electric) charge present in the storage system 29. The charge sensor 30 is a conventional charge sensor and can use a measurement of the electrical voltage generated by the storage system 29 and/or a measurement of the electric current delivered by the storage system 29.

The DC-DC electronic power converter 25 comprises a control unit 31 of its own (provided with a memory and with a microprocessor), which controls the operation of the DC-DC electronic power converter 25, activates (drives) the conversion devices 27 and receives, from the charge sensor 30, the information on the state of charge of the storage system 29. The control unit 31 dialogues with the other control units 32 of the road vehicle 1 through a BUS network (for example using the CAN protocol). The control unit 31 is directly powered by the low-voltage output 28 and, hence, also by the storage system 29; alternatively (or in addition), the control unit 31 is directly powered by the high-voltage input 26 and, hence, is also directly powered by the storage system 14 and/or by the electric machine 8.

According to a preferred (though non-binding) embodiment shown in FIG. 4, a permanent electric line 33 dedicated to the (high-priority) continuous electrical loads and two interruptible electric lines 34 dedicated to the occasional electrical loads originate from the low-voltage output 28 of the DC-DC electronic power converter 25; in particular, an interruptible electric line 34 is reserved to the sole electric starter motor 22 (which has an instantaneous request for power which is much greater than all the other occasional electrical loads), whereas the other interruptible electric line 34 is dedicated to all the other occasional electrical loads. According to other embodiments which are not shown herein, the DC-DC electronic power converter 25 could comprise one single interruptible electric line 34 for all the occasional electrical loads (including the electric starter motor 22) or the DC-DC electronic power converter 25 could comprise three or four interruptible electric lines 34.

According to a preferred (though non-binding) embodiment shown in FIG. 4, for an interruptible electric line 34 there is provided a switch 35 (typically, a solid-state switch), which is controlled by the control unit 31 and is designed to interrupt the interruptible electric line 34; the switch 35 only has cut-off functions, namely it interrupts the "metal" continuity of the electric line 34 when the electric line 34 is not flown through by an electric current with a significant intensity. The other interruptible electric line 34 dedicated to the electric starter motor 22 does not require the presence of a switch 35 of its own, as the electric starter motor 22 has an activation relay of its own and, hence, does not require a specific cut-off. According to a different embodiment which is not shown herein, the electric starter motor 22 could lack an activation relay of its own and, hence, the corresponding interruptible electric line 34 could (not necessarily) have a switch 35. According to a preferred embodiment shown in FIG. 4, the DC-DC electronic power converter 25 comprises one single outer protection casing 36 (made of metal or plastic), which houses, on the inside, the conversion devices 27, the control unit 31, the storage system 29 and the switch 35 (or the switches 35, if there are different switches 35).

As already mentioned above, the three conversion devices 27 are arranged in parallel both at the input and at the output and, as a consequence, the power provided by the conversion devices 27 adds up in the low-voltage output 28 of the DC-DC electronic power converter 25. The three conversion devices 27 are identical to one another and each have a nominal power of approximately 3500-4000 Watts; as a consequence, the cooperation of the three conversion devices 27 allows the low-voltage output 28 of the DC-DC electronic power converter 25 to deliver a total power of 10500-12000 Watts, which is (largely) sufficient to power the electric starter motor 22 (in this phase, which normally lasts 1-2 seconds, other occasional loads could be turned off or limited, if necessary using the switch 35 or the switches 35, if there are different switches 35, in order to avoid distracting too much power from the electric starter motor 22). As already mentioned above, the nominal power of the storage system 29 is modest (20-30 Watts, at most) and, hence, the electric starter motor 22 basically is never powered by the storage system 29; actually, a fraction of electric current powering the electric starter motor 22 also comes from the storage system 29, but this fraction is so small (0.2-0.3% of the total) that it can be neglected and is completely irrelevant.

According to other embodiments which are not shown herein, the number of conversion devices 27 could be different based on the nominal power of each conversion device 27 and based of the total nominal power of the DC-DC electronic power converter 25; for example, there could be one single conversion device 27, two conversion devices 27, four conversion devices 27 or five (or more) conversion devices 27.

When the road vehicle 1 is being used (namely, it is moving in a more or less continuous manner), the electric machine 8 is also used as a generator (for example, though not exclusively, when slowing down) to generate electrical energy which is stored in the storage system 14 of the high-voltage electric circuit 18. Furthermore, when the road vehicle 1 is being used (namely, it is moving in a more or less continuous manner), the DC-DC electronic power converter 25 constantly works in order to transfer electrical energy from the high-voltage electric circuit 18 to the low-voltage electric circuit 19; this electrical energy transferred to the low-voltage electric circuit 19 is used to power (when needed) all the electrical loads of the low-voltage electric circuit 19. As a consequence, when the road vehicle 1 is being used (namely, it is moving in a more or less continuous manner), the storage system 29 of the low-voltage electric circuit 19 is constantly charging and is not used (namely, it never provides electrical energy and, aside from a possible initial charging, it does not absorb electrical energy). Obviously, when the road vehicle 1 is being used (namely, it is moving in a more or less continuous manner), the control unit 31 strictly and continuously keeps the switch 35 (or the switches 35, if there are different switches 35)

closed in order to be able to power the electrical loads connected to the two interruptible electric lines 34 (if necessary, with the sole exception of short instants in which the internal combustion heat engine 5 is started).

When the road vehicle 1 is being used (namely, it is moving in a more or less continuous manner), the control unit 31 estimates the electric power requested by the low-voltage output 28 of the DC-DC electronic power converter 25 (for example, combining the items of information on the state of operation provided by the conversion devices 27) and, hence, based on the electric power requested by the low-voltage output 28, it decides how many converter devices 27 to operate together: if the electric power requested by the low-voltage output 28 is modest, one single conversion device 27 device at a time is used; if the electric power requested by the low-voltage output 28 is medium, two conversion devices 27 at a time are used; whereas, if the electric power requested by the low-voltage output 28 is high (basically, only in case the internal combustion heat engine 5 has to be started by the electric starter motor 22), all the conversion devices 27 are used together. According to a preferred embodiment, the control unit 31 keeps track of the actual use time of each conversion device 27 and, hence, cyclically switches the actually active conversion devices 27 so as to balance (equalize, namely make equal) the actual use times of the conversion devices 27.

When the road vehicle 1 is not used (namely, it is parked "with the key out of the ignition"), the control unit 31 opens the switch 35 (or the switches 35, if there are different switches 35) to stop powering (by removing the electrical voltage) the electrical loads connected to the two interruptible electric lines 34; this operating mode leads to two positive effects: on the one hand, no electrical energy is (uselessly) used, which is what inevitably happens when the occasional electrical loads (despite being deactivated) are anyway supplied with voltage, and especially, on the other hand, the occasional electrical loads are not subjected to a continuous electric stress, which, in the long run (namely, over the course of the years) could even cause a premature ageing (especially for the electronic control units).

When the road vehicle 1 is not used (namely, it is parked "with the key out of the ignition"), the control unit 31 turns off all the conversion devices 27 and normally keeps them turned off; as a consequence, the permanent electrical loads connected to the permanent electric lines 33 are powered by the sole storage system 29. In this phase, the control unit 31 monitors the state of charge of the storage system 29 and, if the state of charge of the storage system 29 is below a charge threshold, the control unit 31 activates one single conversion device 27 to charge the storage system 29 using the electrical energy stored in the storage system 14 of the high-voltage electric circuit 18. In other words, when the road vehicle 1 is not used (namely, it is parked "with the key out of the ignition"), the permanent electrical loads connected to the permanent electric line 33 are powered by the sole storage system 29, which, if and when necessary, is cyclically charged (for example, every 24/48/72 . . . hours, depending on the storage capacity of the storage system 29) by a conversion device 27, which is temporarily activated (for the amount of time needed to ensure a complete charge of the storage system 29, for example 1-2 hours).

Namely, the control unit 31, only when the vehicle 1 is parked, is configured to detect a state of charge of the storage system 29 and to activate one of the three conversion devices 27 only when the state of charge of the storage system 29 is below the charge threshold and only for an amount of time needed to charge the storage system 29.

According to a possible embodiment, when the road vehicle 1 is not used (namely, it is parked "with the key out of the ignition"), the control unit 31 remains turned off (so as not to use the electrical energy of the storage system 29 and reduce the wear thereof) and is turned on by the charge sensor 30 only when the state of charge of the storage system 29 gets below the charge threshold; in other words, the charge sensor 30 cyclically "monitors" the state of charge of the storage system 29 and sends a turn-on signal to the control unit 31 when the state of charge of the storage system 29 gets below the charge threshold so as to cause the control unit 31 to activate a conversion device 27 to charge the storage system 29. In this embodiment, the charge sensor 30 consists of an analogue circuit (for example, a simple comparator, which compares the output voltage of the storage system 29 with a voltage reference) having a minimum circuit complexity and very low energy consumptions.

The DC-DC electronic power converter 25 comprises a charge sensor 30, which is designed to cyclically detect the state of charge of the storage system 29, namely the percentage of residual (electric) charge present in the storage system 29. The charge sensor 30 is a conventional charge sensor and can use a measurement of the electrical voltage generated by the storage system 29 and/or a measurement of the electric current delivered by the storage system 29.

In other words, the control unit 31, when the vehicle 1 is being used, is configured to continuously activate the conversion device 27 so as to have the conversion device 27 continuously deliver the electric power needed to supply the electrical loads of the low-voltage electric circuit 19 and needed to keep the second storage system 29 completely charged; furthermore, the control unit 31, only when the vehicle 1 is not used, namely is parked, is configured to cyclically detect a state of charge of the second storage system 29 and to activate the conversion device 27 only when the state of charge of the second storage system 29 is below a charge threshold and only for an amount of time needed to charge the second storage system 29.

By operating in this way, when the road vehicle 1 is not used (namely, it is parked "with the key out of the ignition"), the conversion devices 27 basically are always turned off (namely, each one works, on an average, for approximately 1-3 hours a week) and, hence, they are not subjected to any type of significant wear; as a consequence, the conversion devices 27 can outlive the road vehicle 1 even in the absence of a specific (and, thus, very expensive) designing aimed at increasing their resistance to wear.

The nominal voltage of the low-voltage electric circuit 19 generally always is 12 Volts, since this value is the only worldwide standard for automotive applications; on the other hand, the nominal voltage of the high-voltage electric circuit 18 could be different from 48 Volts (generally greater than 48 Volts, up to different hundreds of Volts or even a thousand Volts).

Figure 5:
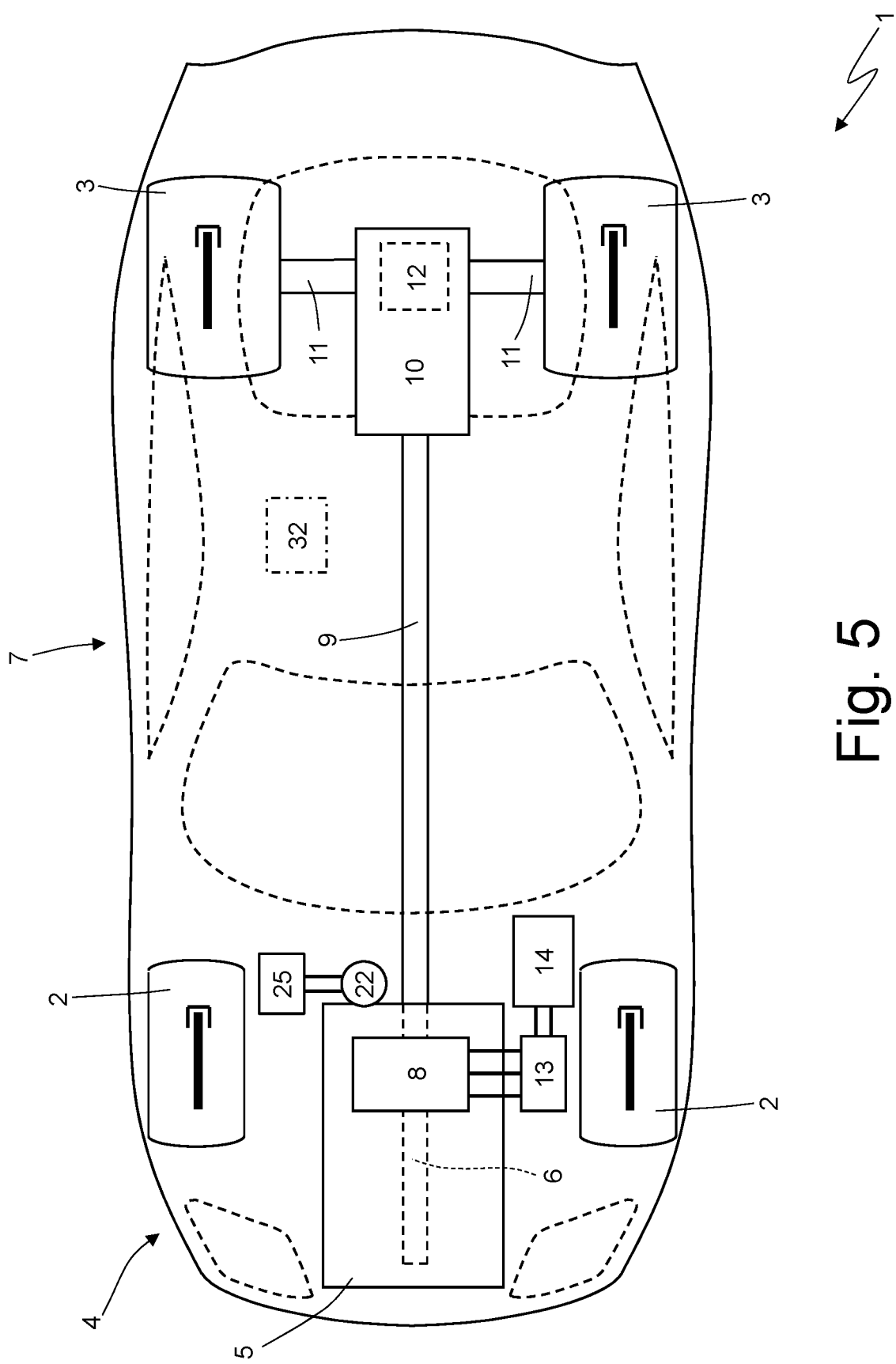
FIG. 5 is a schematic, plan view of a road vehicle provided with an exclusively thermal drive and provided with an electric system according to the invention.

According to a different embodiment shown in FIG. 5, the road vehicle 1 is not a hybrid drive vehicle because the electric machine 14 is always used as a generator and is permanently connected (typically, by means of a belt or chain) to the crankshaft 6 of the internal combustion heat engine 5. In this embodiment, a relatively high electric power needs to be generated (hence, at a nominal voltage of 48 Volts in order not to have excessively high current intensities) so as to power relevant electrical loads, such as, for example, electric actuators of active suspensions. In this application, the DC-AC electronic power converter normally is integrated with the electric machine 8 (namely, it forms a unit together with the electric machine 8).

The embodiments described herein can be combined with one another, without for this reason going beyond the scope of protection of the invention.

The electric system 17 described above has numerous advantages.

First of all, the electric system 17 described above allows for a significant reduction in the size and in the weight of the low-voltage electric circuit 19 thanks to the absence of the traditional chemical battery; to this regard, it should be pointed out that the storage system 29 has performances, a weight and a size that are a modest fraction of the performances, the weight and the size of a traditional chemical battery. This result is obtained thanks to the use of different conversion devices 27, which operate in parallel and, hence, are capable of powering (when needed and, obviously, for a short instant) the electric starter motor 22.

Furthermore, thanks to the presence of the (small) storage system 29, the electric system 17 described above is capable of ensuring a constant supply of power to the continuous electrical loads, though without stressing the conversion devices 27 (namely, without forcing the conversion devices 27 to always work).

Finally, the electric system 17 described above features relatively reduced costs and a relatively small complexity, since it entirely consist of commercial components.

LIST OF THE REFERENCE NUMBERS OF THE FIGURES 1 vehicle
2 front wheels
3 rear wheels
4 powertrain system
5 engine
6 crankshaft
7 drivetrain
8 electric machine
9 drive shaft
10 mechanical transmission
11 axle shafts
12 differential
13 AC/DC electronic power converter
14 storage system
15 pack of chemical batteries
16 frame
17 electric system
18 high-voltage electric circuit
19 low-voltage electric circuit
20 alarm system
21 infotainment system
22 electric starter motor
23 passenger compartment lighting system
24 outer lights
25 DC/DC electronic power converter
26 high-voltage input
27 conversion device
28 low-voltage output
29 storage system
30 charge sensor
31 control unit
32 control unit
33 permanent electric line
34 interruptible electric line
35 switch
36 outer casing

The invention claimed is:

1. An electric system (17) of a road vehicle (1); the electric system (17) comprises:
   a high-voltage electric circuit (18) provided with a first storage system (14) and with at least one electric machine (8) designed to generate electrical energy;
   a low-voltage electric circuit (19) provided with a plurality of electrical loads, wherein a selected one of the low-voltage and high-voltage electric circuits is constituted by an electric starter motor (22) of an internal combustion heat engine (5) of the vehicle (1); and
   a DC-DC electronic power converter (25), which connects the low-voltage electric circuit (19) and the high-voltage electric circuit (18) to one another in order to transfer electrical energy from the high-voltage electric circuit (18) to the low-voltage electric circuit (19);
   wherein the low-voltage electric circuit (19) is completely free from any storage system arranged on the outside of the DC-DC electronic power converter (25);
   wherein the DC-DC electronic power converter (25) comprises a high-voltage input (26), a low-voltage output (28), a conversion device (27), which is capable of varying the DC electrical voltage and is interposed between the high-voltage input (26) and the low-voltage output (28), and a control unit (31), which controls the conversion device (27);
   wherein the DC-DC electronic power converter (25) comprises a second storage system (29), which is connected to the low-voltage output (28) and is integrated in the DC-DC electronic power converter (25);
   wherein the control unit (31), when the vehicle ignition is on, is configured to continuously activate the conversion device (27) so as to have the conversion device (27) continuously deliver the electric power needed to supply the electrical loads of the low-voltage electric circuit (19) and needed to keep the second storage system (29) completely charged;
   wherein the control unit (31), only when the vehicle ignition is off, is configured to cyclically detect a state of charge of the second storage system (29) and to activate the conversion device (27) only when the state of charge of the second storage system (29) is below a charge threshold and only for an amount of time needed to charge the second storage system (29);
   wherein the second storage system (29) has a nominal performance that is smaller than 10% of a nominal performance of the electric starter motor (22) such that the second storage system (29) is not capable of supplying the operating power needed by the electric starter motor (22) by itself;
   wherein the DC-DC electronic power converter (25) comprises at least two conversion devices (27), which are identical to one another and are connected to one another in parallel both in the high-voltage input (26) and in the low-voltage output (28);
   wherein the control unit (31) is configured, when the vehicle ignition is on, to estimate an electric power requested by the low-voltage output (28) and decide how many converter devices (27) to operate together depending on the electric power requested by the low-voltage output (28);
   wherein only the cooperation of the at least two conversion devices (27) allows the DC-DC electronic power converter (25) to deliver a total power sufficient to power the electric starter motor (22); and wherein a fraction of electric current powering the electric starter motor (22) also comes from the second storage system (29) and is negligible.

2. An electric system (17) according to claim 1, wherein the control unit (31) is configured, only when the vehicle ignition is off, to turn off the conversion device (27) and to normally keep it turned off, so that the electrical loads of the low-voltage electric circuit (19) are exclusively supplied with power by the second storage system (29).

3. An electric system (17) according to claim 1, wherein the control unit (31) is configured, only when the vehicle ignition is off, to activate one single conversion device (27) in order to charge the second storage system (29) when the state of charge of the second storage system (29) is below the charge threshold.

4. An electric system (17) according to claim 1, wherein the control unit (31) is configured to keep track of the actual use time of each converter device (27) and to cyclically switch the actually active converter devices (27) so as to balance the actual use times of the converter devices (27).

5. An electric system (17) according to claim 1, wherein the electrical loads of the low-voltage electric circuit (19) comprise:
- at least one continuous electrical load, which must constantly be supplied with power regardless of the use of the vehicle (1); and
- at least one occasional electrical load, which must be supplied with power only when the vehicle (1) is used.

6. An electric system (17) according to claim 5, wherein:
- a permanent electric line (33), to which the continuous electrical load is connected, originates from the DC-DC electronic power converter (25);
- an interruptible electric line (34), to which the occasional electrical load is connected, originates from the DC-DC electronic power converter (25);
- the permanent electric line (33) is directly connected to the conversion device (27) without the interposition of any switch;
- the DC-DC electronic power converter (25) comprises a switch (35), which is interposed between the conversion device (27) and the interruptible electric line (34); and
- the control unit (31) closes the switch (35) and keeps it closed, when the vehicle ignition is on, and opens the switch (35) and keeps it open, when the vehicle ignition is off.

7. An electric system (17) according to claim 6, wherein two interruptible electric lines (34), to which different occasional electrical loads are connected, originate from the DC-DC electronic power converter (25).

8. An electric system (17) according to claim 1, wherein:
- the electrical loads of the low-voltage electric circuit (19) comprise at least one continuous electrical load, which must constantly be supplied with power regardless of the use of the vehicle (1); and
- the second storage system (29) is sized so as to be capable of autonomously supplying with power the sole continuous electrical load.

9. An electric system (17) according to claim 1, wherein the second storage system (29) has a nominal power below 30 Watt and a storable electric charge below 6 Ah.

10. An electric system (17) according to claim 1, wherein the second storage system (29) only comprises supercapacitors.

11. An electric system (17) according to claim 1, wherein the DC-DC electronic power converter (25) comprises one single outer protection casing (36), which houses, on the inside, the conversion device (27), the control unit (31) and the second storage system (29).

12. An electric system (17) according to claim 1, wherein:
- the DC-DC electronic power converter (25) comprises exactly three conversion devices (27), which are connected to one another in parallel both in the high-voltage input (26) and in the low-voltage output (28); and
- all the three conversion devices (27) are used together only to power the electric starter motor (22) in case the internal combustion heat engine (5) has to be started.

13. An electric system (17) according to claim 12, wherein:
- the three conversion devices (27) are identical to one another and each have a nominal power of approximately 3500-4000 Watts;
- the second storage system (29) has a nominal power below 30 Watt.

14. An electric system (17) according to claim 13, wherein a fraction not greater than 0.2-0.3% of the total of electric current powering the electric starter motor (22) also comes from the second storage system (29).

15. An electric system (17) according to claim 1, wherein a fraction not greater than 0.2-0.3% of the total of electric current powering the electric starter motor (22) also comes from the second storage system (29).

16. An electric system (17) according to claim 1, wherein the nominal performance of the second storage system (29) is smaller than 1% of the nominal performance of the electric starter motor (22).

* * * * *